US008485474B2

(12) United States Patent
Cutler et al.

(10) Patent No.: US 8,485,474 B2
(45) Date of Patent: Jul. 16, 2013

(54) AERIAL REFUELING BOOM NOZZLE WITH INTEGRAL PRESSURE REGULATION

(75) Inventors: Lance A. Cutler, Maize, KS (US); Mark A. Shelly, Be Aire, KS (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 12/872,696

(22) Filed: Aug. 31, 2010

(65) Prior Publication Data

US 2012/0049004 A1 Mar. 1, 2012

(51) Int. Cl.
*B64D 39/00* (2006.01)

(52) U.S. Cl.
USPC .................. 244/135 A; 244/1 TD; 244/135 R

(58) Field of Classification Search
USPC ................................ 244/1 TD, 135 R, 135 A
See application file for complete search history.

(56) References Cited

U.S. PATENT DOCUMENTS

| 2,716,527 A * | 8/1955 | Latimer-Needham | 244/3 |
| 2007/0040065 A1* | 2/2007 | Von Thal | 244/135 A |

FOREIGN PATENT DOCUMENTS

| EP | 1731422 A1 | 12/2006 |
| EP | 1894840 A1 | 3/2008 |
| GB | 822819 A | 11/1959 |
| WO | WO 2010084316 A2 * | 7/2010 |

OTHER PUBLICATIONS

International Search Report and Written Opinion dated Dec. 28, 2011 in PCT Application No. PCT/US11/45006.

* cited by examiner

*Primary Examiner* — Timothy D Collins
*Assistant Examiner* — Jamie S Stehle
(74) *Attorney, Agent, or Firm* — Hope Baldauff, LLC

(57) ABSTRACT

Apparatus and methods described herein provide for a boom/receiver-type aerial refueling system having a pressure regulator integrated into the system at the tanker boom nozzle. During refueling operations, pressure of the fuel at the interface between the nozzle at the distal end of the boom assembly and the fuel receptacle of the receiving aircraft is maintained by an integrated pressure regulator integrated into the nozzle or located inline of the fuel flow between the boom assembly and the nozzle. The integrated pressure regulator maintains the pressure of the fuel at the nozzle within a defined range regardless of the elevation azimuth of the boom assembly, the extended length of the telescoping extension, the temperature of the outside air or surfaces of the boom, and other factors that may affect the flow of fuel through the boom.

20 Claims, 4 Drawing Sheets

AERIAL REFUELING BOOM NOZZLE WITH INTEGRAL PRESSURE REGULATION

BACKGROUND

Aerial refueling allows for increased effective range and extended operation of aircraft, traditionally in military and transport operations and potentially in future commercial freight and passenger aircraft. Aerial refueling involves a supply aircraft, or "tanker," that carries a fuel supply and provides an aerial refueling system that can engage a receiving aircraft to transfer fuel from the fuel supply to the receiving aircraft while both aircraft are in-flight. One commonly used aerial refueling system is the "boom and receiver" system, in which a boom coupled to a rear portion of the tanker is deployed to engage the receiving aircraft. The boom normally includes a rigid, aerodynamically shaped portion coupled with a telescoping extension positioned at an end of the boom. The telescoping extension includes a nozzle configured to be received by a fuel receptacle of the receiving aircraft.

The aerodynamic portion of the boom further includes a ruddevator assembly, generally comprised of airfoils, that permits a refueling operator in the tanker to maneuver the boom and nozzle relative to the receiving aircraft. During an aerial refueling operation, the operator may release the boom from a stowed position and extend the telescoping portion of the boom. The boom may then be directed towards the receiving aircraft by controlling the aerodynamic surfaces to guide the end of the boom containing the nozzle into the fuel receptacle on the receiving aircraft. While the nozzle and fuel receptacle are coupled, the telescoping extension may permit fuel to be continuously transferred by accommodating small relative motions occurring between the tanker and the receiving aircraft.

A goal of the aerial refueling system is to deliver fuel at the nozzle at a specific flow rate and a specific pressure. Controlling the delivery fuel pressure to the highest specified delivery pressure may minimize receiver time on the tanker boom of the receiving aircraft and avail the tanker for other aircraft needing to be refueled. While the flow rate may vary based on the type of the receiving aircraft being refueled, the pressure at the interface between the nozzle and the fuel receptacle should remain within defined tolerances for efficient refueling operations. If the pressure of the fuel at the nozzle is too low, the refueling may not take place or may not be efficient. If the pressure is too high, the refueling operation may cause damage to the fuel systems and/or plumbing of the receiving aircraft.

In traditional boom/receiver-type aerial refueling systems, the pressure of the fuel at the nozzle is traditionally controlled by a pressure regulator in the fuel supply system located inside the fuselage of the tanker that regulates the pressure and flow of fuel at a point before it enters the boom. However, pressure drops or gains may occur within the boom as the fuel flows downstream to the nozzle due to factors such as the elevation azimuth of the boom, the extension length of the telescoping portion, the flow rate of fuel through the boom, the temperature of the air outside the boom, and the like. Further, changes to the position, elevation azimuth, and extension length of the boom during the refueling operation may cause the pressure at the nozzle to vary throughout the operation, affecting refueling efficiency as well presenting safety issues.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for a boom/receiver-type aerial refueling system having a pressure regulator integrated into the system at the tanker boom nozzle. According to aspects presented herein, an aerial refueling system includes a fuel supply, a boom assembly for conducting fuel to a nozzle at the distal end of the boom, and a nozzle for engaging a fuel receptacle of the receiving aircraft. The aerial refueling system further includes a pressure regulator located at or near the nozzle configured to keep the pressure of the fuel at the nozzle within a defined range regardless of the flow rate of the fuel through the boom. In one implementation, the pressure regulator is integrated into the nozzle. In another implementation, the pressure regulator is located inline of the fuel flow between the boom assembly and the nozzle.

According to further aspects presented herein, a method for transferring fuel from a supply aircraft to a receiving aircraft includes maneuvering a boom assembly connected to the supply aircraft such that a nozzle on the distal end of the boom engages a fuel receptacle of the receiving aircraft. Once the nozzle and fuel receptacle are engaged, a fuel system pumps fuel through the boom assembly to the nozzle, and into the receiving aircraft. The pressure of the fuel at the nozzle is maintained within a defined range by an integrated pressure regulator located at or near the nozzle. In yet a further aspect, a boom nozzle for a boom/receiver-type aerial refueling system includes an integrated pressure regulator configured to maintain the pressure of fuel flowing from the boom assembly through the nozzle within a defined range during refueling operations.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus and methods for providing a boom/receiver-type aerial refueling system having a pressure regulator integrated into the system at the tanker boom nozzle. Utilizing the concepts and technologies described herein, regulation of pressure of the fuel at the interface of the nozzle and the fuel receptacle of the receiving aircraft may be performed hydromechanically at or near the nozzle at the distal end of the boom, instead of in the fuselage of the supply aircraft as found in traditional boom and receiver aerial refueling systems.

Because pressure regulation occurs at the nozzle, a consistent pressure of fuel to the receiving aircraft can be maintained regardless of the variations in the elevation azimuth of the boom, the extended length of the telescoping extension, the flow rate of fuel through the boom, the air temperature outside of the boom, or other factors. Maintaining a consistent pressure of fuel at the interface of the nozzle and the fuel receptacle may allow for more efficient aerial refueling as well as mitigating damage to the fuel systems and/or plumbing of the receiving aircraft. In addition, tighter control of the delivery pressure to the maximum delivery pressure increases fuel flow and reduces the time of fuel transfer. Reduced fuel transfer time may increase tanker availability for other receiving aircraft and reduce vulnerability of the tanker and receiving aircraft while in close proximity during refueling.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
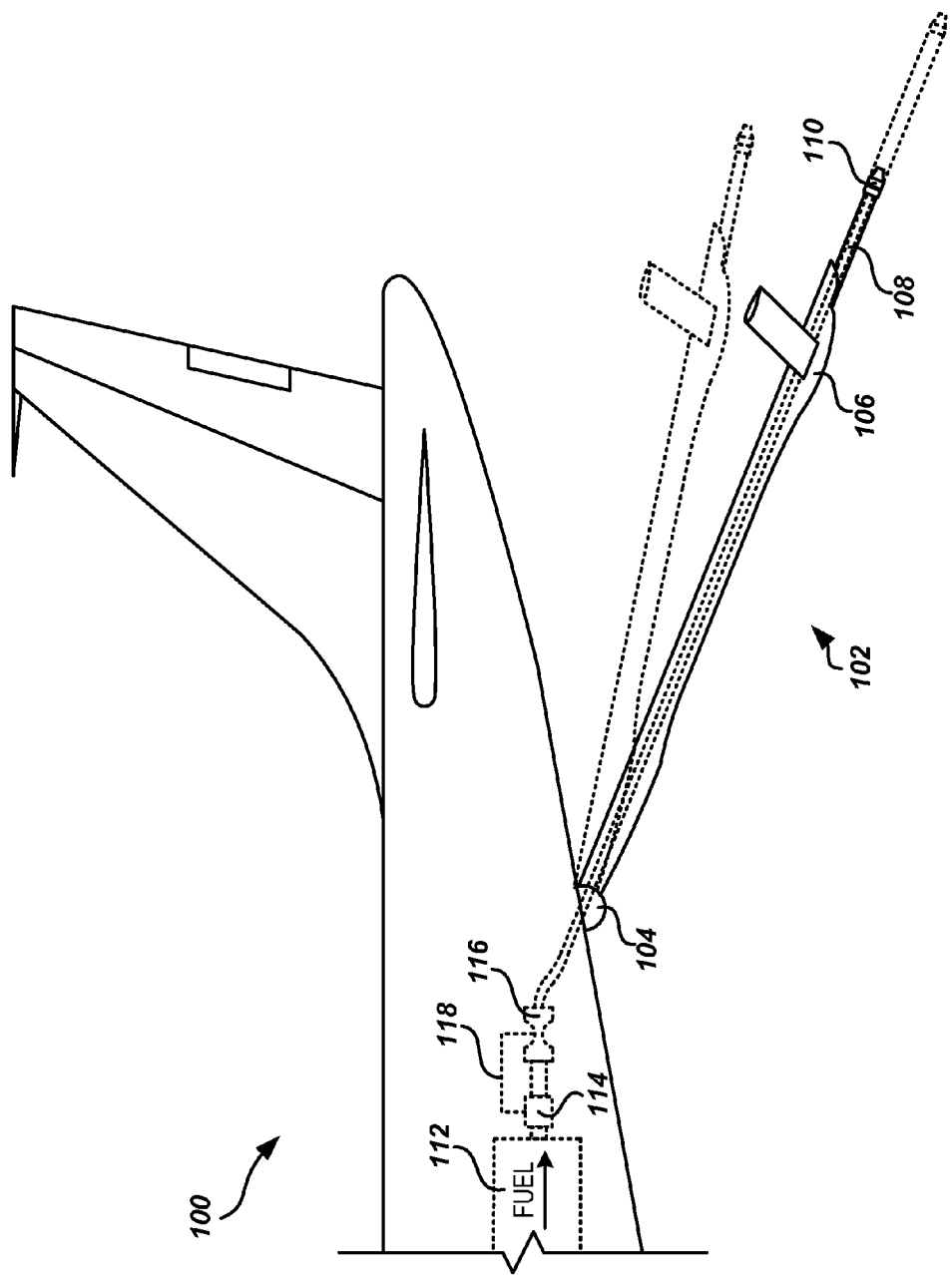
FIG. 1 is a side view of a traditional boom/receiver-type aerial refueling system attached to a tanker aircraft, as is known in the art.

FIG. 1 illustrates a typical boom/receiver-type aerial refueling system 100 attached to the tail section of a supply aircraft or "tanker," such as the KC-10, KC-135, or KC-767 aircraft produced by The Boeing Company of Chicago, Ill. The aerial refueling system 100 includes a boom assembly 102 that is attached to the fuselage of the tanker at an articulating joint 104, allowing the boom to move freely during refueling operations. The boom assembly 102 may consist of a rigid portion 106, a telescoping extension 108, and a nozzle 110. The rigid portion 106 of the boom assembly 102 may be aerodynamically shaped and include airfoils and control surfaces, such as a v-tail with "ruddevators," that provide stability to the boom as it flies through the air as well as permit a refueling operator in the tanker to maneuver the boom assembly during refueling operations, as shown in the figure.

The telescoping extension 108 extends from the rigid portion 106 of the boom assembly 102. The extended length of the telescoping extension 108 may be adjusted by the refueling operator in order to lengthen or shorten the overall length of the boom assembly 102 as required during refueling operations and stowing of the boom, as further shown in the figure. In addition, the telescoping extension 108 may move freely during refueling, allowing the boom assembly 102 to accommodate small relative motions occurring between the tanker and the receiving aircraft while the nozzle 110 is engaged with the fuel receptacle of the receiving aircraft.

The nozzle 110 is attached to the distal end of the telescoping extension 108 of the boom assembly 102, and is configured to be received by a fuel receptacle of the receiving aircraft, such as a universal aerial refueling receptacle slipway installation ("UARRSI"). During an aerial refueling operation, the operator may utilize the control surfaces of the rigid portion 106 of the boom assembly 102 to guide the boom towards the receiving aircraft and engage the fuel receptacle with the nozzle 110. Once the nozzle 110 is engaged with the fuel receptacle of the receiving aircraft, fuel is pumped from a fuel system 112 onboard the tanker through the rigid portion 106 and telescoping extension 108 of the boom assembly 102 and into the receiving aircraft through the interface between the nozzle 110 and the fuel receptacle.

It may be a requirement of the receiving aircraft that the fuel be provided at the interface between the nozzle 110 and the fuel receptacle within specified ranges for flow rate and pressure. Further, the flow rate may vary from one type of receiving aircraft to the next, based on the capabilities of the aircraft's internal fuel system and plumbing. For example, a newer bomber aircraft may receive fuel during aerial refueling at 1200 gallons-per-minute ("gpm"), while an older fighter aircraft may only be capable of receiving fuel at 400 or 500 gpm. Moreover, the pressure range of the fuel may be defined consistently across all aircraft. For example, the fuel pressure for aerial refueling may be specified at 50±5 pounds-per-square-inch gauge ("psig"). Providing fuel within the defined pressure range may allow for efficient refueling operations while preventing damage to the fuel systems and/or plumbing of the receiving aircraft that may occur if the pressure is too high.

As further shown in FIG. 1, the pressure of the fuel in the traditional boom/receiver system is controlled by a pressure/flow regulator device 114 installed inline with the fuel system 112 inside the fuselage of the tanker. The pressure/flow regulator device 114 may further receive feedback from a venturi manifold 116 through a sense line 118 in order to keep the pressure within the defined range as the flow rate of fuel changes. This type of pressure/flow regulator device 114, however, is only effective at controlling the pressure of the fuel in the system before the fuel enters the boom assembly 102, and cannot account for variations in pressures that may occur downstream from the device during refueling. For example, fuel pressure drops and/or gains may occur in the boom assembly 102 during refueling operations due to various factors, such as changes in the elevation azimuth of the boom or the extended length of the telescoping extension 108, movement of the boom, varying flow velocities as the fuel passes through different portions of the boom and nozzle 110, changes to the fluid density of the fuel due to the temperature of the air outside the boom, and the like.

While changes in an individual factor may only account for two or three psig variation in the pressure of the fuel, the overall variation in pressure resulting from a combination of factors may cause the pressure to fall below or exceed the defined pressure range, reducing the efficiency of the refueling operation and/or potentially causing damage to the refueling aircraft. One solution to this problem involves locating a pressure transducer in the nozzle 110 to measure the pressure of the fuel at the interface between the nozzle and the fuel receptacle. The signal from the transducer may be sent back to the pressure/flow regulator device 114, which may then adjust the flow in order to maintain the desired pressure. In order to power the transducer and transmit the signal from the transducer back to the pressure/flow regulator device 114, electrical wiring may be installed along the boom assembly 102 and the telescoping extension 108 to the nozzle 110.

Another solution involves the use of lookup tables containing adjustments to the flow to be made by an electronically controlled pressure/flow regulator device 114 based on values of the various downstream factors. For example, one lookup table may contain adjustments to the flow that should be made by the pressure/flow regulator device 114 based on different angles of the boom. The control routine for the fuel system 112 would read the current boom elevation azimuth during refueling operations and use the lookup table to apply the necessary adjustment to the flow in order to maintain the desired pressure at the nozzle 110. Such a system of lookup tables may allow the control routine to estimate the pressure at the nozzle 110 and modify the actual output pressure at the pressure/flow regulator device 114 in order to achieve a fuel pressure at the interface between the nozzle and the fuel receptacle of the receiving aircraft within the defined pressure range.

Figure 2:
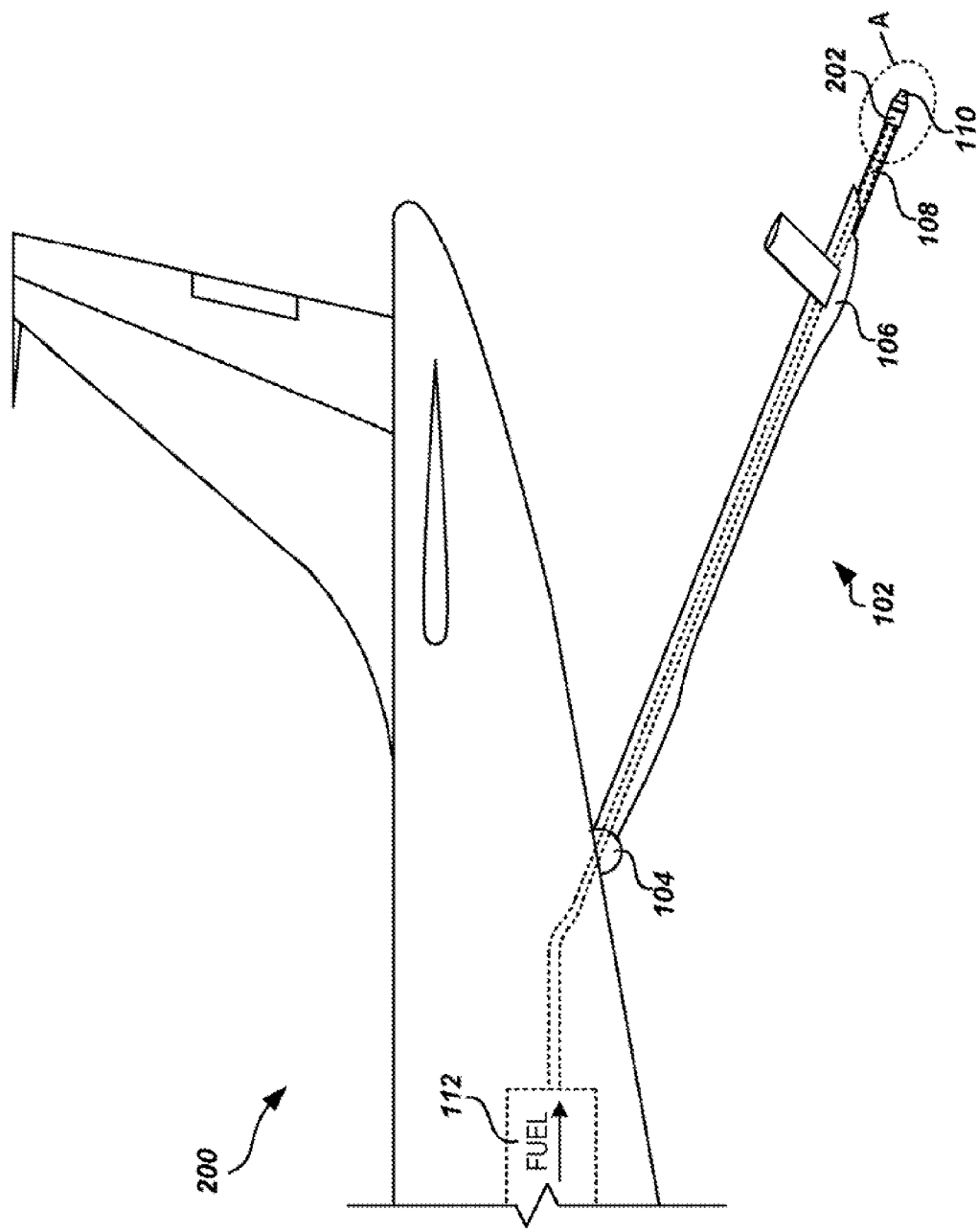
FIG. 2 is a side view of an alternative boom/receiver-type aerial refueling system having a pressure regulator integrated into the system at the tanker boom nozzle, according to embodiments presented herein.

FIG. 2 shows an alternative boom/receiver-type aerial refueling system 200 having a pressure regulator integrated into the system at the tanker boom nozzle, according to the embodiments described herein. As shown in the figure, an integrated pressure regulator 202 is located inline with the fuel flow at the distal end of the boom assembly 102 at or just before the nozzle 110. Because the integrated pressure regulator 202 is located at the distal end of the boom assembly 102, the regulator is able to accommodate changes in factors upstream in the boom and still provide fuel pressure within the desired range. For example, changes in the elevation azimuth of the boom assembly 102 or the extended length of the telescoping extension 108 of the boom during refueling operations will have little if any affect on the fuel pressure at the interface between the nozzle 110 and the fuel receptacle of the receiving aircraft. The integrated pressure regulator 202 is able to raise or lower the pressure of the fuel proximate to the fuel receptacle of the receiving aircraft. Thus if a rise in the elevation azimuth should cause a reduction in fuel pressure upstream from the integrated pressure regulator 202, the pressure regulator can adjust to increase the pressure of the fuel.

According to one embodiment, the integrated pressure regulator 202 is configured to control the pressure of the fuel at the nozzle 110 for all flow rates supported by the fuel system 112. For example, the integrated pressure regulator 202 may be configured to maintain the pressure of the fuel at the nozzle at 50±5 psig for flow rates from 0 to 1200 gpm. In this way, the alternative boom/receiver-type aerial refueling system 200 may be used to refuel a wide variety of aircraft while maintaining pressure of the fuel at the interface between the nozzle 110 and the fuel receptacle of the receiving aircraft within the defined range. In another embodiment, the integrated pressure regulator 202 operates hydromechanically, and thus requires no separate power or control from the fuel system 112 in the fuselage of the tanker. This prevents having to have electrical and control wiring running from the fuel system in the fuselage down the boom assembly 102 and the telescoping extension 108 to the integrated pressure regulator 202.

As may be further seen in FIG. 2, the integrated pressure regulator 202 may remove the need for the pressure/flow regulator device 114, the venturi manifold 116, and the connecting sense lines 118 found in the traditional boom/receiver aerial refueling system, thus reducing the complexity of the overall fuel system 112 in the tanker. In addition, the integrated pressure regulator 202 allows control of the fuel pressure directly at the interface between the nozzle 110 and the fuel receptacle of the receiving aircraft without the need for wiring installed along the boom assembly 102 or the use of a control system with lookup tables for downstream factors.

In another embodiment, the integrated pressure regulator 202 may be used in series with the pressure/flow regulator device 114. The pressure/flow regulator device 114 may be used to keep the upstream pressure within a first desired range, while the integrated pressure regulator 202 is used to keep the downstream pressure of the fuel within a second desired range. For example, the pressure/flow regulator device 114 may be used to keep the upstream fuel pressure above a predetermined level to ensure that the integrated pressure regulator 202 can lower the fuel pressure within the desired range for transfer to the receiving aircraft.

In alternative embodiments, the integrated pressure regulator 202 may work in conjunction with the pressure/flow regulator device 114 or other flow regulators or systems in the fuel system of the tanker in order to maintain pressure of the fuel at the nozzle 110. For example, the integrated pressure regulator 202 may be electronically controlled by signals from a transducer located at the interface between the nozzle 110 and the fuel receptacle of the receiving aircraft, as described above. The control routine in the fuel system of the tanker may further combine information regarding the pressure regulation characteristics of the integrated pressure regulator 202 with system lookup tables regarding downstream factors to adjust the flow of fuel upstream of the pressure regulator to ensure the pressure at the nozzle remains within the defined parameters.

Figure 3A:
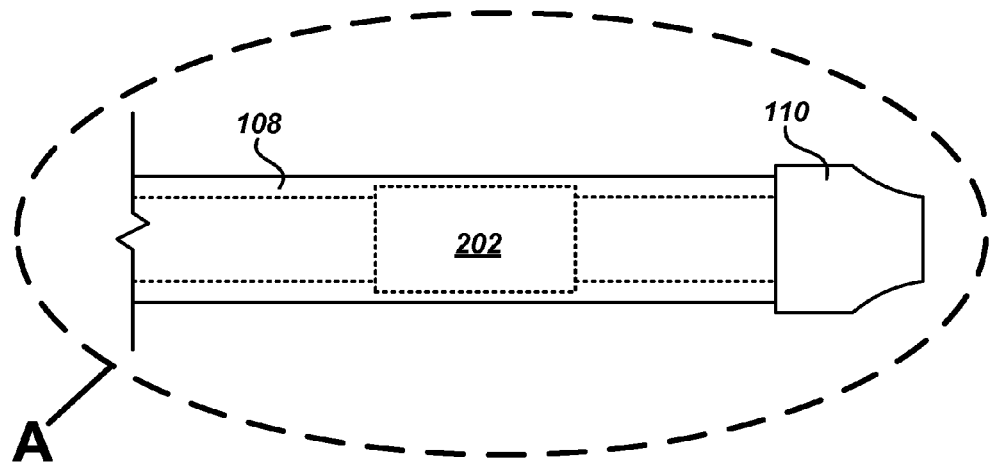
FIG. 3A is a detailed view of the nozzle located at the distal end of the boom having a pressure regulator located between the boom assembly and the nozzle, according to embodiments presented herein.
Figure 3B:
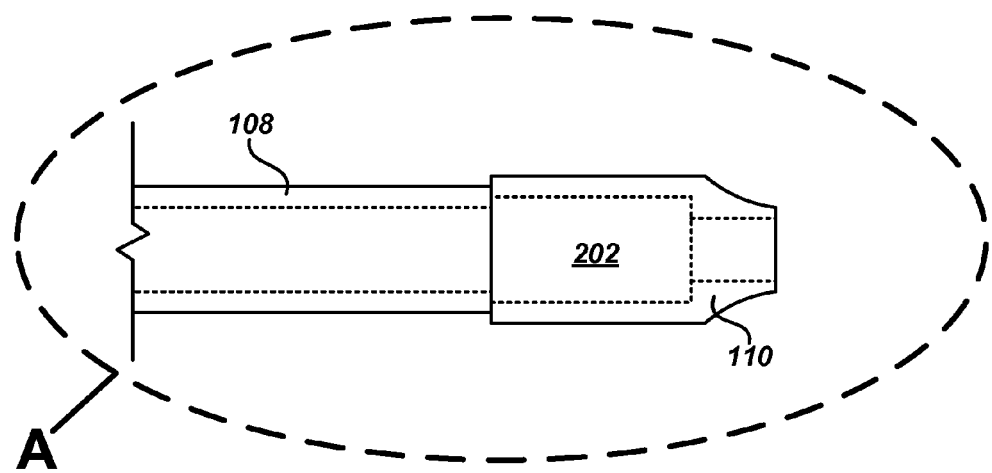
FIG. 3B is a detailed view of the nozzle located at the distal end of the boom having an integrated pressure regulator, according to embodiments presented herein.

In one embodiment, the integrated pressure regulator 202 is installed inline of the fuel flow through the telescoping extension 108 of the boom assembly 102 just upstream of the nozzle 110, as shown in FIG. 3A. For example, the integrated pressure regulator 202 may be installed between the end of the existing boom assembly 102 and the nozzle 110, or the regulator may be designed to be small enough to be inserted into the distal end of the telescoping extension 108 of the boom just before the coupling with the nozzle 110. In another embodiment, the integrated pressure regulator 202 is integrated into nozzle 110 itself, as shown in FIG. 3B. This integrated solution reduces the overall number of parts in the alternative boom/receiver-type aerial refueling system 200 and may be more easily retrofitted to the booms of existing systems.

Figure 4:
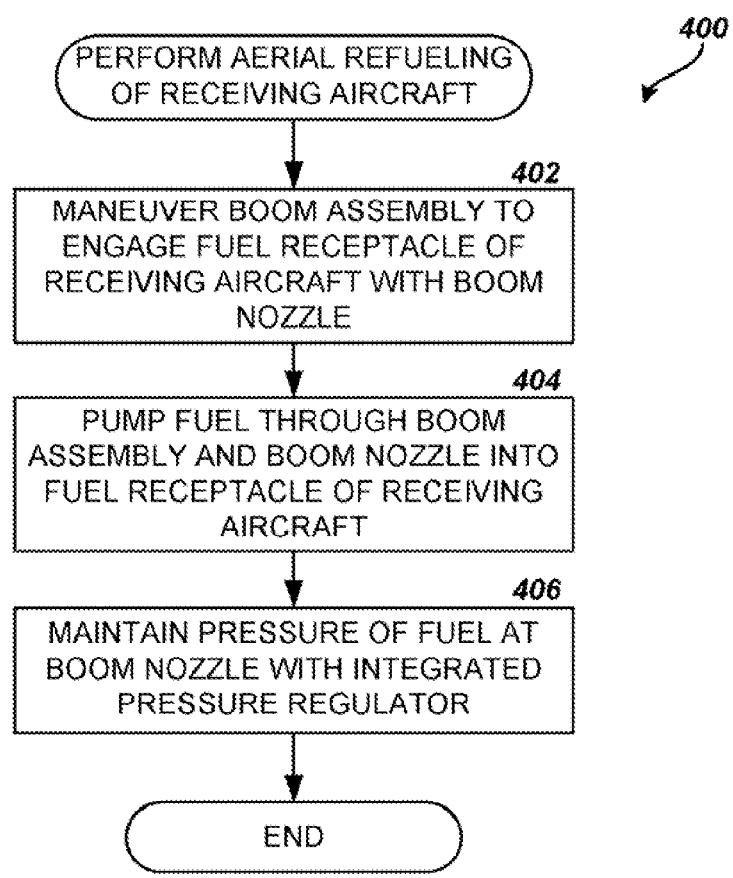
FIG. 4 is a flow diagram showing one method of refueling an aircraft through a boom/receiver-type aerial refueling system having a pressure regulator integrated into the system at the tanker boom nozzle, according to embodiments described herein.

As described above, the integrated pressure regulator 202 allows control of the fuel pressure in the alternative boom/receiver-type aerial refueling system 200 close to the interface between the nozzle 110 and the fuel receptacle of the receiving aircraft, regardless of flow rates and changes to flow occurring upstream of the nozzle in the boom assembly 102. FIG. 4 shows one method 400 for performing aerial refueling of an aircraft utilizing the alternative boom/receiver-type aerial refueling system 200, according to embodiments described herein. It should be appreciated that more or fewer operations may be performed than shown in FIG. 4 and described below, and that the operations may be performed in a different order than that described herein.

The method 400 begins at operation 402, where the boom assembly 102 is maneuvered by the refueling operator aboard the tanker aircraft such that the nozzle 110 located at the end of the boom engages a fuel receptacle of the receiving aircraft. As described above in regard to FIG. 1, the rigid portion 106 of the boom assembly 102 may include a ruddevator assembly or other control surfaces that allow the refueling operator to maneuver the boom and nozzle 110 into position relative to the receiving aircraft. This may require adjusting the elevation azimuth of the boom assembly 102 as well as extending the telescoping extension 108 of the boom, both of which may affect the flow of fuel through the boom.

Once the nozzle 110 at the distal end of the boom assembly 102 engages the fuel receptacle of the receiving aircraft, the fuel receptacle may be caused to latch or otherwise detachably connect to the nozzle in order to receive the fuel transfer. While the nozzle 110 and fuel receptacle of the receiving aircraft are engaged, the boom assembly 102 may be allowed to articulate freely around the articulating joint 104, and the telescoping extension 108 of the boom allowed to freely extend and recede, in order to accommodate small relative motions occurring between the tanker and the receiving aircraft during refueling. These changes in boom position and the extended length of the telescoping extension 108 may further affect the flow of fuel through the boom assembly during the refueling operation.

From operation 402, the method 400 continues to operation 404, fuel is pumped through the rigid portion 106 of the boom assembly 102, then through the telescoping extension 108 to the nozzle 110, and into the fuel receptacle of the receiving aircraft. According to one embodiment, the fuel system 112 maintains a defined flow rate of fuel through the boom assembly 102 and into the receiving aircraft. As indicated at operation 406, the pressure at the interface between the nozzle 110 and the fuel receptacle of the receiving aircraft is maintained by the integrated pressure regulator 202 within a defined range, such as 50±5 psig. According to embodiments, the pressure of the fuel at the nozzle 110 is maintained within the defined range, regardless of the flow rate of fuel, the elevation azimuth of the boom assembly 102, the extended length of the telescoping extension 108, the temperature of the outside air or surfaces of the boom, or other factors that can affect the flow of fuel upstream of the nozzle 110 in the boom. From operation 406, the method 400 ends.

Based on the foregoing, it should be appreciated that technologies for implementing a boom/receiver-type aerial refueling system having a pressure regulator integrated into the system at the tanker boom nozzle are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for performing aerial refueling of a receiving aircraft, the system comprising:
   a boom assembly attached to a supply aircraft at a proximal end and configured to conduct fuel from a fuel supply in the supply aircraft to a nozzle;
   the nozzle attached to a distal end of the boom assembly and configured to interface with a fuel receptacle on the receiving aircraft; and
   a pressure regulator installed within the boom assembly or the nozzle, within the distal end of the boom assembly, and configured to keep a pressure of the fuel at the nozzle substantially the same regardless of a flow rate of fuel from the fuel supply to the receiving aircraft.

2. The system of claim 1, wherein the pressure regulator is incorporated inline of the flow of fuel through the boom assembly to the nozzle.

3. The system of claim 1, wherein the pressure regulator is integrated into the nozzle.

4. The system of claim 1, wherein the boom assembly comprises a telescoping extension, and wherein the pressure regulator is located at or near the distal end of the telescoping extension.

5. The system of claim 1, wherein the pressure regulator operates hydromechanically and requires no electric power or control.

6. The system of claim 5, wherein the pressure regulator is configured to keep the pressure of the fuel at the nozzle within five pounds-force per square inch gauge ("psig") of 50 psig.

7. The system of claim 1, further comprising a fuselage of the supply aircraft to which the boom assembly is attached.

8. A method of transferring fuel from a supply aircraft to a receiving aircraft, the method comprising:
   maneuvering a boom assembly connected to the supply aircraft relative to the receiving aircraft such that a nozzle attached to a distal end of the boom assembly engages a fuel receptacle of the receiving aircraft;
   pumping fuel from a fuel system onboard the supply aircraft through the boom assembly and the nozzle into the fuel receptacle of the receiving aircraft; and
   maintaining a pressure of the fuel at the nozzle within a defined range with a pressure regulator installed within the boom assembly or the nozzle, within the distal end of the boom assembly.

9. The method of claim 8, wherein the pressure regulator is incorporated inline of the flow of fuel through the boom assembly to the nozzle.

10. The method of claim 8, wherein the pressure regulator is integrated into the nozzle.

11. The method of claim 8, wherein the boom assembly comprises a telescoping extension, and wherein the pressure regulator is located at or near the distal end of the telescoping extension.

12. The method of claim 8, wherein the pressure regulator operates hydromechanically and requires no electric power or control.

13. The method of claim 12, wherein the defined range for the pressure of the fuel is 50±5 psig.

14. The method of claim 12, wherein the pressure regulator is configured to maintain the pressure of the fuel at the nozzle within the defined range for flow rates between 0 and 1200 gpm.

15. An apparatus comprising a nozzle with an integrated pressure regulator configured for use of in a boom/receiver-type aerial refueling system, wherein the nozzle is attached to a distal end of a boom assembly, to engage a fuel receptacle of a receiving aircraft, and to maintain a pressure of fuel flowing from the boom assembly through the nozzle within a defined range.

16. The apparatus of claim 15, wherein the nozzle is configured to engage a universal aerial refueling receptacle slipway installation ("UARRSI") on the receiving aircraft.

17. The apparatus of claim 15, wherein the integrated pressure regulator operates hydromechanically and requires no electric power or control.

18. The apparatus of claim 17, wherein the defined range for the pressure of the fuel is 50±5 psig.

19. The apparatus of claim 17, wherein the integrated pressure regulator is configured to maintain the pressure of the fuel at the nozzle within the defined range for flow rates between 0 and 1200 gpm.

20. The apparatus of claim 17, wherein the boom assembly comprises a telescoping extension, and wherein the nozzle is configured to attach to a distal end of the telescoping extension.

* * * * *